L. E. WATERMAN.
LISTER CULTIVATOR.
APPLICATION FILED APR. 22, 1909.
1,000,650.
Patented Aug. 15, 1911.
2 SHEETS—SHEET 1.
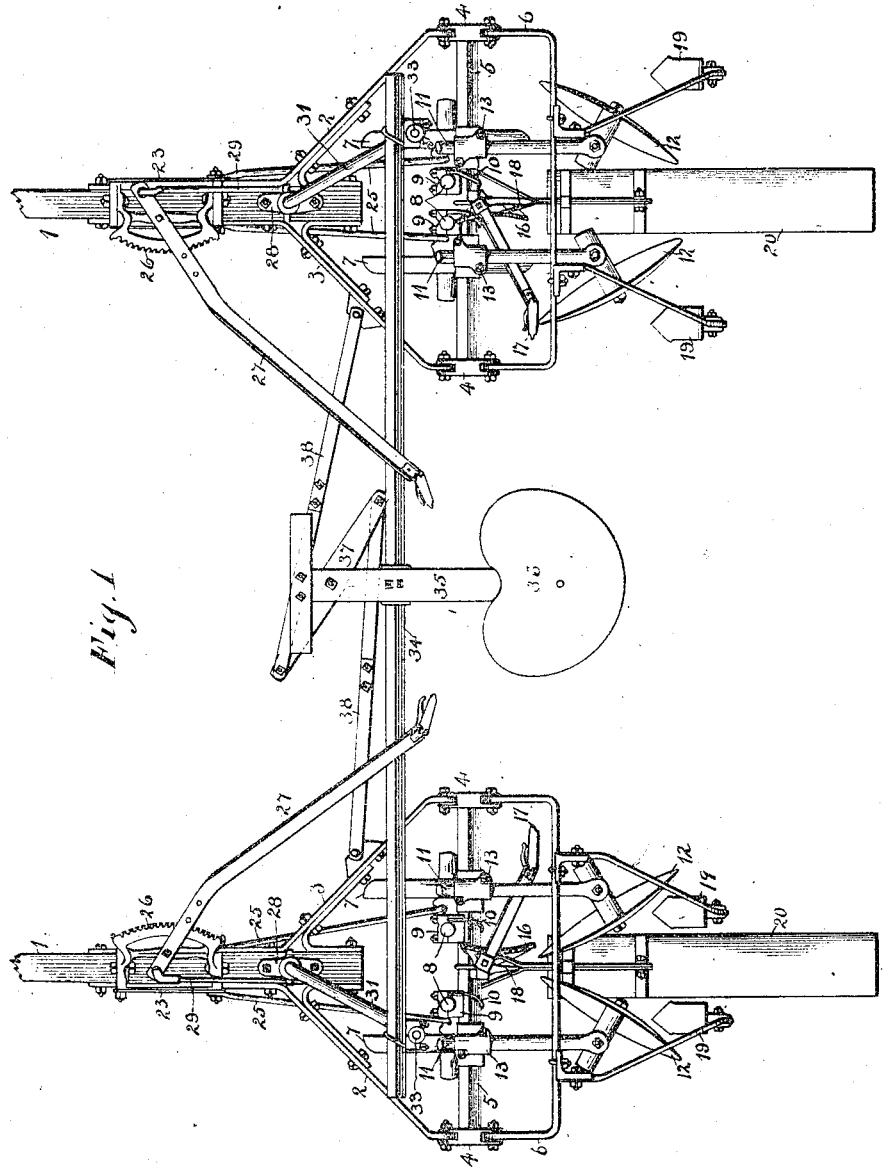

L. E. WATERMAN.
LISTER CULTIVATOR.
APPLICATION FILED APR. 22, 1909.
1,000,650.
Patented Aug. 15, 1911.
2 SHEETS—SHEET 2.
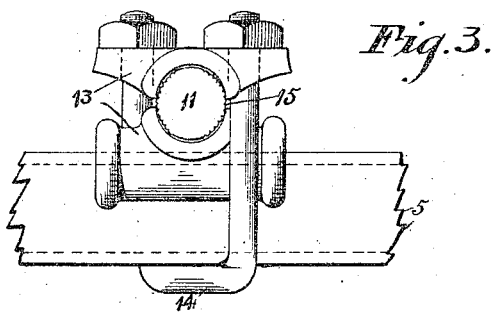
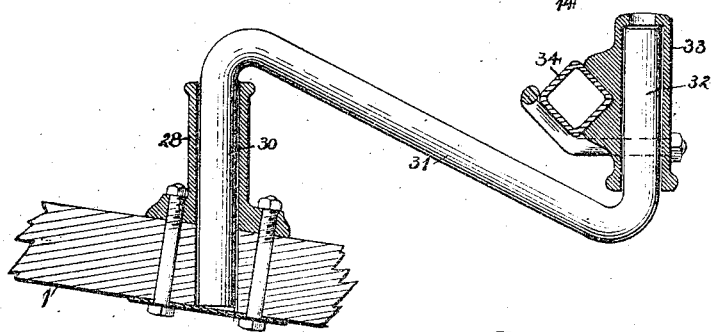
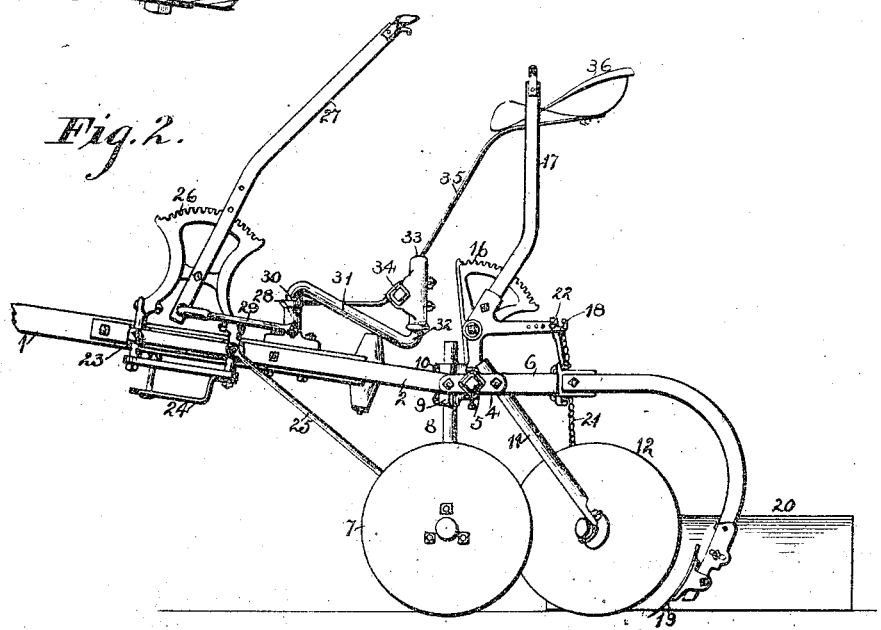

UNITED STATES PATENT OFFICE.

LEWIS E. WATERMAN, OF ROCKFORD, ILLINOIS, ASSIGNOR TO EMERSON-BRANTINGHAM CO., OF ROCKFORD, ILLINOIS, A CORPORATION OF ILLINOIS.

LISTER-CULTIVATOR.

1,000,650.   Specification of Letters Patent.   Patented Aug. 15, 1911.

Application filed April 22, 1909. Serial No. 491,642.

*To all whom it may concern:*

Be it known that I, LEWIS E. WATERMAN, a citizen of the United States, residing at Rockford, in the county of Winnebago and State of Illinois, have invented certain new and useful Improvements in Lister-Cultivators, of which the following is a specification.

The object of this invention is to support the seat of a lister cultivator so that it will always remain centrally between the two sections of cultivating devices.

The further object of this invention is to form a draft hitch with the cultivating devices in order that the team may cause them to enter the ground.

In the accompanying drawings, Figure 1 is a plan view of my improved lister cultivator. Fig. 2 is an end elevation. Fig. 3 is an end view of a shank of one of the disk supports and its connection with its support. Fig. 4 is an elevation of the seat support, the brackets for the support being in section.

My lister cultivator comprises two like sections, each supporting cultivating devices, and a description of one complete section will apply to both.

A tongue 1 has the frame bars 2 and 3 bolted thereto. To the free ends of these bars are pivoted intermediate sections 4 which are connected by the square bar 5. To the rear ends of these intermediate sections is pivoted to the rear section 6 of the frame.

To the square bar 5 are connected two carrying wheels 7, their shanks 8 being clamped thereto by the clamps 9 and U bolts 10. To the square bar 5 are clamped two shanks 11 to which are connected the disks 12. The clamps holding these shanks are in two sections 13 held together and in connection with the square bar 5 by the U bolt 14. The outer surface of the shanks 11 are formed with serrations 15 in which the edges of the sections 13 are seated, and which admit of the shanks being adjusted axially, thereby presenting the disks in different angles to the ground. To the square bar 5 between the carrying wheels 7 is secured a toothed segment 16, and a hand lever 17 has a pivotal connection with the segment and is provided with the usual dog and thumb latch connection with the lever. This hand lever 17 is provided with a rearward extension 18. To the section 6 of the frame are secured shovels 19 which are located in rear of the disks 12. A shield 20 has a connection with the shanks 8 of the carrying wheels 7, and a chain 21 connects it with the extension 18 of the lifting lever 17. A link 22 connects the extension 18 with the rear section 6 of the frame.

By means of the hand lever 17, the rear section 6 of the frame is raised or lowered in its pivotal connection with the intermediate section 4 supporting the square bar 5. The shovels 19 and shield 20 will be raised and lowered therewith.

Around the tongue 1 is located a slidable yoke 23 to the underside of which is connected a hitch 24 to which the evener may be connected. Rods 25 form connections between the yoke 23 and the shanks 8 of the carrying wheels. A toothed segment 26 has a fixed connection with the yoke 23 and a hand lever 27 has a pivotal connection with the toothed segment and is provided with the usual dog and thumb lever for holding it in engagement with the toothed segment. A bracket 28 is secured to the upper face of the tongue 1 and a rod 29 connects this bracket with the hand lever 27.

By means of the hand lever 27 the relative position of the yoke 23 with respect to the bracket 28 may be changed, and when moved toward the bracket 28 the carrying wheels 7 will be moved rearward which will rock the square bar 5 and the toothed segment 16 and disks 12 connected therewith, and through the connections between the lever 17 and the rear frame section 6, the shield 20, and the shovels 19 will be raised. By releasing the hand lever 27 from its engagement with the toothed segment 26 of the yoke 23, the team connected to the hitch 24 will force the disks and shovels 19 into the ground.

In each of the brackets 28 is located the section 30 of a substantially Z-shaped bracket 31, and the other end 32 is clamped in a socket 33. The sockets 33 are clamped to a seat bar 34 which connects the two tool supporting sections of the lister cultivator. A seat support 35 is fixedly clamped to the seat bar 39, and a seat 36 has a connection with the seat support.

To the lower end of the seat support is pivoted a cross-bar 37. Sectional links 38 have one end pivotally connected to the opposite ends of the cross-bar 37, and their other ends are pivotally connected to the frame bars 3 of the tool supporting sections.

As the tool supporting sections are free to follow the rows of listed corn, the seat 36 will always remain equidistant between the sections, this is accomplished by the cross-bar 37, and the links 38, and the swinging brackets 31. Without the equalizing devices comprising the seat support 35, cross-bar 37 and links 38, the seat-bar 34, and seat 36, supported thereby would swing laterally of the tongue 1, and should one of the tool supporting sections be lower than the other, the seat would swing toward that section. Should the other section become the lower, the seat would then swing toward that section. By the employment of the equalizing devices the seat is always maintained equidistant between the tool supporting sections independent of the inequalities of the ground.

I claim as my invention.

1. In a lister cultivator, the combination with spaced tool supporting sections having sockets, of a seat bar extending transversely thereof, and having sockets, and substantially Z-shaped brackets each formed of a single rod having a depending end journaled in the socket of one of the tool-supporting sections, and an upstanding end journaled in a socket of the seat bar.

2. In a lister cultivator, the combination of a tongue, a tool supporting section connected with the tongue carrying wheels for the sections, a yoke slidably mounted on the tongue, a toothed segment supported by the yoke and slidable therewith, a hand lever pivoted to the toothed segment and provided with means for engaging with the segment, a connection between the lever and tongue, and connections between the yoke and supporting wheels.

3. In a lister cultivator, the combination with a tongue member, of a frame bar pivotally connected thereto, ground wheels, tool elements connected to the frame bar, a reciprocatory yoke slidable on the tongue member, a link pivotally connecting the yoke and bar, a lever on and reciprocating with the yoke, and a connection between the lever and the tongue member for reciprocating said yoke and thereby effecting the pivotal movement of the bar and the swinging movement of the wheels and tool elements.

4. In a lister cultivator, the combination with a tongue, of a swinging tool support pivotally connected thereto, a yoke slidably mounted on the tongue, a link pivotally connected to the yoke and the tool support, a lever fulcrumed on and slidable with the yoke, a link pivoted to the lever and to the tongue, and means for connecting the yoke and lever to hold the latter in different positions, said lever constituting means for reciprocating the yoke.

5. In a lister cultivator, the combination with a tongue having a frame, of a cross bar pivotally connected thereto, a rear section pivoted to the cross bar, tool elements and ground wheels mounted on the cross bar and rear section, a lever fulcrumed on the cross bar and having connections with the rear section for swinging the same with respect to said cross bar, a yoke slidably mounted on the tongue, a link connection between the yoke and the cross bar, a lever fulcrumed on the yoke, means for holding the lever in different positions on the yoke and a link connection between the lever and the tongue.

In testimony whereof I have hereunto set my hand in presence of two subscribing witnesses.

LEWIS E. WATERMAN.

Witnesses:
A. O. BEHEL,
E. D. E. N. BEHEL.